United States Patent
Kang et al.

(10) Patent No.: US 11,470,668 B2
(45) Date of Patent: Oct. 11, 2022

(54) DEVICE, BASE STATION, AND CONTROL METHODS THEREOF IN WIRELESS COMMUNICATION SYSTEM

(71) Applicant: Samsung Electronics Co., Ltd., Suwon-si (KR)

(72) Inventors: Youngmyoung Kang, Seongnam-si (KR); Woohwan Lee, Suwon-si (KR); Minseok Jeon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 200 days.

(21) Appl. No.: 16/638,342

(22) PCT Filed: Jul. 27, 2018

(86) PCT No.: PCT/KR2018/008529
§ 371 (c)(1),
(2) Date: Feb. 11, 2020

(87) PCT Pub. No.: WO2019/039753
PCT Pub. Date: Feb. 28, 2019

(65) Prior Publication Data
US 2020/0229255 A1  Jul. 16, 2020

(30) Foreign Application Priority Data

Aug. 22, 2017  (KR) .................. 10-2017-0105921

(51) Int. Cl.
*H04W 76/16* (2018.01)
*H04W 76/34* (2018.01)
(Continued)

(52) U.S. Cl.
CPC ....... *H04W 76/16* (2018.02); *H04W 36/0066* (2013.01); *H04W 36/00837* (2018.08);
(Continued)

(58) Field of Classification Search
CPC . H04W 36/04; H04W 48/20; H04W 36/0061; H04W 36/023; H04W 36/00835;
(Continued)

(56) References Cited

U.S. PATENT DOCUMENTS

2005/0107085 A1  5/2005  Ozluturk
2010/0002653 A1  1/2010  Agiwal et al.
(Continued)

FOREIGN PATENT DOCUMENTS

CN  106165488 A  11/2016
EP  2 144 464 A2  1/2010
(Continued)

OTHER PUBLICATIONS

European Search Report dated Jun. 5, 2020, issued in European Application No. 18848819.1.
(Continued)

*Primary Examiner* — Jung Liu
(74) *Attorney, Agent, or Firm* — Jefferson IP Law, LLP (57) ABSTRACT

The present disclosure relates to a pre-5th-Generation (5G) or 5G communication system to be provided for supporting higher data rates Beyond 4th-Generation (4G) communication system such as Long Term Evolution (LTE). A control method of a device according to one embodiment of the present invention may comprise the steps of: receiving, from a first base station, information on at least one second base station existing within a critical distance from the first base station; and determining, on the basis of the information, whether a wireless communication system of the at least one second base station is to be used.

12 Claims, 9 Drawing Sheets

(51) Int. Cl.
*H04W 36/00* (2009.01)
*H04W 36/08* (2009.01)
*H04W 88/10* (2009.01)
*H04W 36/32* (2009.01)
*H04W 48/04* (2009.01)

(52) U.S. Cl.
CPC ........... *H04W 36/08* (2013.01); *H04W 36/32* (2013.01); *H04W 48/04* (2013.01); *H04W 76/34* (2018.02); *H04W 88/10* (2013.01)

(58) Field of Classification Search
CPC ..... H04W 48/08; H04W 48/12; H04W 36/30; H04W 16/32; H04W 68/12; H04W 68/005; H04W 48/18; H04W 68/02; H04W 88/06
See application file for complete search history.

(56) References Cited

U.S. PATENT DOCUMENTS

| | | | |
|---|---|---|---|
| 2010/0118847 A1 | 5/2010 | Lee et al. | |
| 2010/0304749 A1* | 12/2010 | Dwyer | H04W 36/0061 455/443 |
| 2014/0287753 A1* | 9/2014 | Schulist | H04W 36/0022 455/436 |
| 2014/0335882 A1 | 11/2014 | Lee et al. | |
| 2015/0245407 A1* | 8/2015 | Johansson | H04W 76/18 370/329 |
| 2016/0174104 A1* | 6/2016 | Jang | H04W 28/08 455/453 |
| 2016/0227459 A1 | 8/2016 | Fujishiro et al. | |
| 2017/0118689 A1* | 4/2017 | Zhang | H04W 48/16 |
| 2017/0181052 A1 | 6/2017 | Zhang et al. | |
| 2017/0265113 A1* | 9/2017 | Lindoff | H04W 36/14 |
| 2017/0311217 A1* | 10/2017 | Jung | H04W 36/00835 |
| 2018/0007583 A1 | 1/2018 | Hong et al. | |
| 2018/0007589 A1* | 1/2018 | Jang | H04W 48/12 |
| 2018/0027545 A1* | 1/2018 | Kato | H04W 72/02 370/329 |
| 2018/0109979 A1* | 4/2018 | Mustajärvi | H04W 36/14 |
| 2019/0045480 A1* | 2/2019 | Horn | H04W 68/12 |

FOREIGN PATENT DOCUMENTS

| | | |
|---|---|---|
| KR | 10-1248542 B1 | 4/2013 |
| WO | 2010/128290 A1 | 11/2010 |
| WO | 2016/053426 A1 | 4/2016 |
| WO | 2016/142742 A1 | 9/2016 |
| WO | 2017/080598 A1 | 5/2017 |

OTHER PUBLICATIONS

Korean Office Action dated Aug. 13, 2021, issued in Korean Application No. 10-2017-0105921.

* cited by examiner

SMOOTH SERVICE

ORDINARY SERVICE

LIMITED SERVICE

DEVICE, BASE STATION, AND CONTROL METHODS THEREOF IN WIRELESS COMMUNICATION SYSTEM

TECHNICAL FIELD

The disclosure relates to a wireless communication system and, more specifically, to a device and method for easily connecting to a 5G communication system and efficiently using a service related to the 5G communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a region in which a general 4G communication system and a 5G communication system coexist, there is the need for a method that enables a device to easily use both the 4G and 5G communication systems.

DISCLOSURE OF INVENTION

Technical Problem

In accordance with the need, an aspect of the disclosure is to enable a device using a general 4G communication system to easily use a 5G communication system.

Solution to Problem

A method for controlling a device in a wireless communication system according to one embodiment of the disclosure may include: receiving, from a first base station, information relating to at least one second base station existing within a critical distance from the first base station; and determining, based on the information, whether to use a wireless communication system of the at least one second base station.

Meanwhile, a method for controlling a first base station according to an embodiment of the disclosure may include: broadcasting information relating to at least one second base station existing within a critical distance from the first base station, wherein the information includes at least one of a public land mobile network (PLMN) identifier of the at least one second base station, location information of the at least one second base station, coverage information of the at least one second base station, density information of the at least one second base station, and information relating to the strength of a signal of a communication system of the at least one second base station, and based on the information, a device having received the information determines whether to use a wireless communication system of the at least one second base station.

In addition, a device in a wireless communication system according to one embodiment of the disclosure may include: a transceiver configured to transmit or receive a signal; and a controller configured to: control the transceiver to receive, from a first base station, information relating to at least one second base station existing within a critical distance from the first base station; and based on the information, determine whether to use a wireless communication system of the at least one second base station.

Meanwhile, a first base station in a wireless communication system according to one embodiment of the disclosure may include: a transceiver configured to transmit or receive a signal; and a controller configured to control the transceiver to broadcast information relating to at least one second base station existing within a critical distance from the first base station, wherein the information includes at least one of a public land mobile network (PLMN) identifier of the at least one second base station, location information of the at least one second base station, coverage information of the at least one second base station, density information of the at least one second base station, and information relating to the strength of a signal of a communication system of the at least one second base station, and based on the information, a device having received the information determines whether to use a wireless communication system of the at least one second base station.

Advantageous Effects of Invention

According to the disclosure, a device can previously determine whether a 5G communication system is connectable or whether the 5G communication system can be used continuously, by using information broadcast by a 4G base station.

MODE FOR THE INVENTION

Hereinafter, embodiments of the disclosure will be described in detail with reference to the accompanying drawings.

In describing the embodiments, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to make the disclosure complete and clearly inform those skilled in the art of the scope of the disclosure, and the disclosure is defined only by the scope of the appended claims. Throughout the specification, the same reference numerals designate the same elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block(s). These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block(s).

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession can in fact be executed substantially concurrently or the blocks can sometimes be executed in the reverse order, depending upon the functionality involved.

As used herein, the "unit" or "module" refers to a software element or a hardware element, such as a field programmable gate array (FPGA) or an application specific integrated circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

In the disclosure, a terminal may include generally a mobile terminal and may indicate a device that is previously joined in a mobile communication system and receives services provided from the mobile communication system. The mobile terminal may include a smart device, such as a smart phone, and a tablet PC, which merely corresponds to an example, and the disclosure is not limited thereto.

Meanwhile, in the following description, a term for identifying an access node, terms for indicating network entities, terms for indicating messages, a term for indicating an interface between network entities, terms for indicating various identification information, and the like are examples for convenience of explanation. Therefore, the disclosure may not be limited by the terminologies provided below, and other terms that indicate subjects having equivalent technical meanings may be used.

For convenience of description, terms and names defined in 3GPP LTE (3rd Generation Partnership Project Long Term Evolution) standards will be used in the disclosure. However, the disclosure is not limited to the terms and names, and may be applied to a system following another standard in the same way.

A structure of a next generation mobile communication system to which the disclosure may be applied will be briefly described. A wireless access network of a next generation mobile communication system (hereinafter, new radio (NR) or 5G) includes a next generation base station (new radio node B, hereinafter, NR gNB or NR base station) and a new radio core network (NR CN). A user terminal (new radio user equipment, hereinafter, NR UE or terminal) accesses an external network through a NR gNB and a NR CN.

The NR gNB corresponds to an evolved node B (eNB) of a conventional LTE system. The NR gNB is connected to the NR UE through a wireless channel and may provide an outstanding service compared to a conventional node B. In the NR system, all the user traffic is serviced thorough shared channels, and thus an apparatus that collects state information, such as the buffer states of UEs, an available transmission power state, and a channel state, and performs scheduling, is required, and an NR NB serves as the apparatus. One NR gNB generally controls a plurality of cells. In order to implement very-high-speed data transfer compared to the current LTE, the NR gNB may have a bandwidth wider than the conventional maximum bandwidth, may employ an orthogonal frequency division multiplexing (hereinafter, referred to as OFDM) as a wireless access technology, and a beamforming technology may be additionally integrated therewith. Further, an adaptive modulation and coding (hereinafter, referred to as an AMC) scheme for determining a modulation scheme and a channel coding rate according to a channel state of the terminal is employed. The NR CN may perform functions such as mobility support, bearer configuration, and QoS configuration. The NR CN is an apparatus which is responsible for various control functions as well as a mobility management function for a terminal, and is connected to a plurality of base stations. Also, the NR system may be linked to a conventional LTE system, and the NR CN is connected to a MME through a network interface. The MME is connected to an eNB that is a conventional base station.

Hereinafter, a base station described according to an embodiment of the disclosure may indicate a 5G base station that transmits a signal by using a beam formed by beamforming in a super-high frequency (mmWave) band as described above.

Figure 1A:
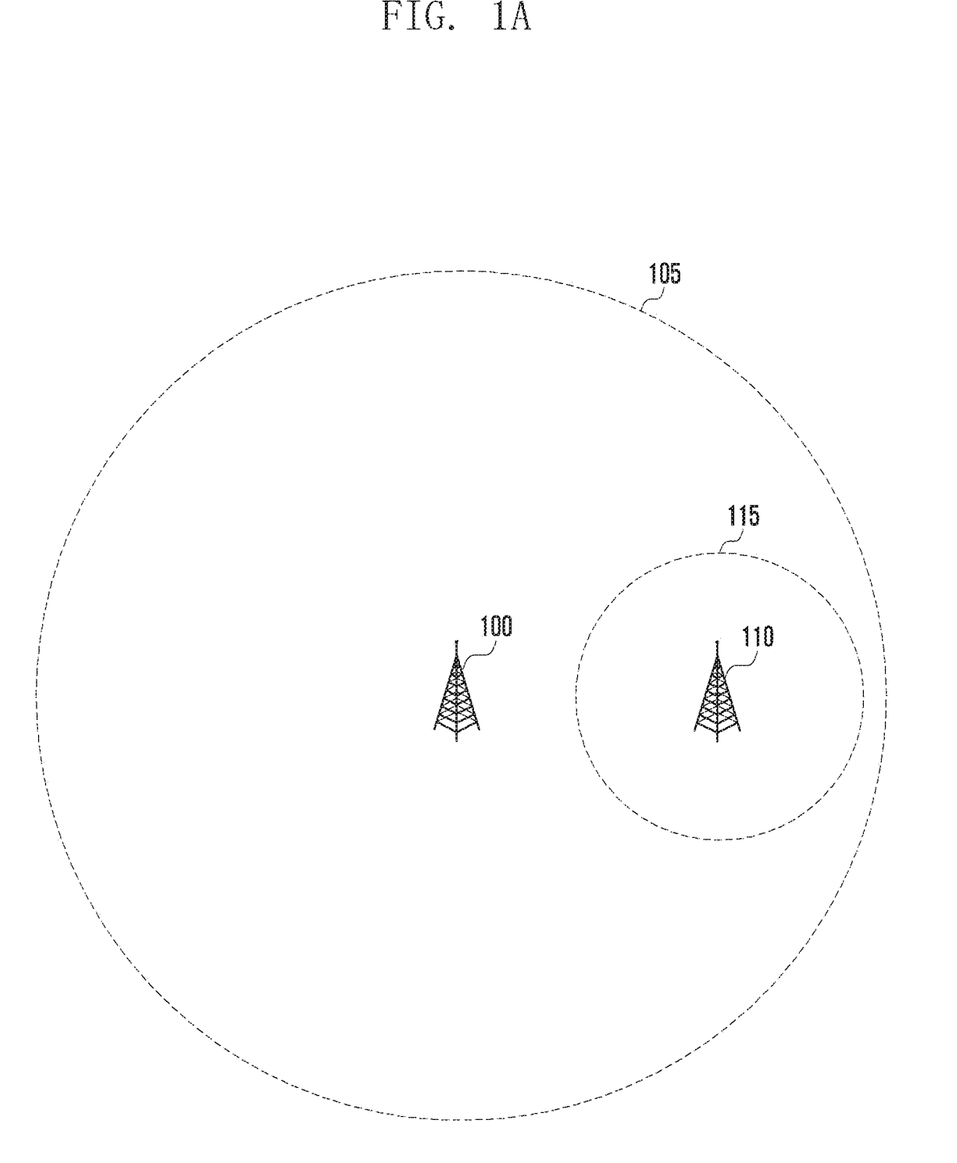
FIGS. 1A and 1B illustrate embodiments in which a coverage of at least one 5G base station exists within a coverage of a 4G base station.
Figure 1B:
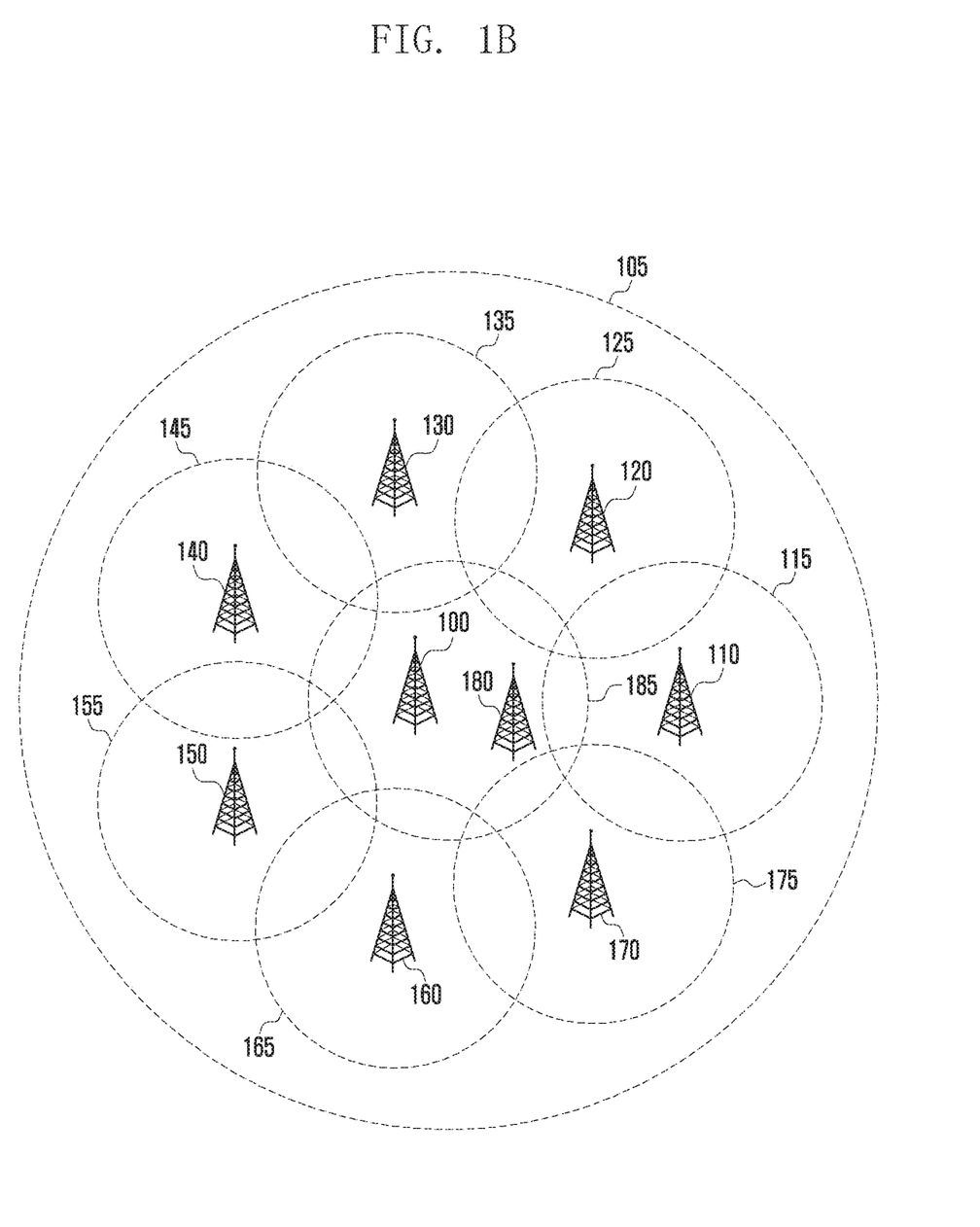

FIGS. 1A and 1B illustrate an embodiment in which a coverage of at least one 5G base station exists within a coverage of a 4G base station.

Specifically, FIG. 1A illustrates an embodiment in which one 5G base station 110 exists within a coverage 105 of a 4G base station 100. Generally, a coverage 115 of the 5G base station 110 may be smaller than the coverage 105 of the 4G base station 100. Therefore, as the inclusion illustrated in FIG. 1A, the coverage 115 of the 5G base station 110 may be included in the coverage 105 of the 4G base station 100.

In the case as illustrated in FIG. 1A, 5G wireless communication service may be smoothly provided within the coverage 115 of the 5G base station 110. However, in the coverage 105 of the 4G base station 100 except for the coverage 115 of the 5G base station 110, 4G wireless communication service may be smoothly provided, and 5G wireless communication service may not be smoothly provided.

Meanwhile, FIG. 1B illustrates an embodiment in which a plurality of 5G base stations 110, 120, 130, 140, 150, 160, 170, and 180 exist within a coverage 105 of a 4G base station 100. In the embodiment illustrated in FIG. 1B, 5G wireless communication service may be smoothly provided within coverages 115, 125, 135, 145, 155, 165, 175, and 185 of the plurality of 5G base stations 110, 120, 130, 140, 150, 160, 170, and 180.

The 4G base station 100 of the embodiments illustrated in FIGS. 1A and 1B may broadcast information relating to at least one 5G base station to a device.

For example, the 4G base station 100 illustrated in FIG. 1A may broadcast information relating to the 5G base station 110. In addition, the 4G base station 100 illustrated in FIG. 1B may broadcast information relating to the plurality of 5G base stations 110, 120, 130, 140, 150, 160, 170, and 180.

The information broadcast by the 4G base station 100 may include a public land mobile network (PLMN) identifier of a corresponding 5G base station, location information of the 5G base station, coverage information of the 5G base station, density information of the 5G base station, information relating to the strength of a signal of a communication system of the 5G base station, and the like. The coverage information of the 5G base station may indicate information relating to the location and area of a region in which a wireless signal is smoothly transmitted or received to or from the 5G base station. The density information of the 5G base station may indicate information indicating how dense the installation of the 5G base station is. For example, if the number of 5G base stations installed within a critical area is a first number or greater, the density is "high", if the number of 5G base stations installed within the critical size is smaller than the first number and equal to or greater than a second number, the density is "medium", and if the number of 5G base stations installed within the critical size is smaller than the second number, the density is "low". Furthermore, the 4G base station may broadcast information relating to the density "high", "medium", or "low" as the density information of the 5G base station.

In other words, information broadcast by the 4G base station 100 may enable the device having received the information to determine whether to easily use a wireless communication system provided by the 5G base station.

Therefore, if the device having received the information determines, based on the received information, that a wireless communication service provided by the 5G base station is smooth, the device may attempt to connect to the 5G base station. In addition, if the device having previously connected to the 5G base station determines whether a wireless communication service provided by the 5G base station will be smooth continuously, the device may determine whether to operate a program or application based on the 5G communication service.

Furthermore, the device having received the information may control On/Off of a 5G chip for use of a 5G wireless communication service, based on information transmitted by the 4G base station 100. For example, if the 4G base station 100 broadcasts information indicating that a 5G wireless communication service within a critical distance has a high quality and the density of a 5G base station is high, a device having received the information may turn on the power of a 5G chip that has been turned off. In addition, the device may attempt to connect to the 5G base station.

While the device is previously connected to a 5G base station and uses a communication service provided by the 5G base station, if the device receives information broadcast by the 4G base station, the device may determine, based on the information, whether to maintain the connection to the 5G base station. Specifically, if according to the information transmitted by the 4G base station, it is determined that the density of the 5G base station decreases or the strength of a signal of the 5G base station decreases, the device may disconnect from the 5G base station and turn off the power of the 5G chip. In addition, the device may terminate an application or program that is operating based on a 5G wireless communication service, or inform a user to terminate the application or program.

Meanwhile, the 4G base station 100 may broadcast a message including location information of at least one 5G base station. For example, the 4G base station 100 may broadcast global positioning system (GPS) information or map information relating to the location of at least one 5G base station. A terminal having received location information of the 5G base station may identify the location of the 5G base station. In addition, the terminal may determine whether to use a 5G wireless communication service, the determination being performed based on the location of the 5G base station and a moving path of the terminal.

Furthermore, a device may calculate the maintenance possibility of a 5G wireless communication service, based on the number of messages including information relating to 5G base stations, received from the 4G base station 100. For example, if the received messages including the information relating to the 5G base stations are large, the device may calculate a high possibility that the device stays within the coverages of the 5G base stations. Meanwhile, if the received messages including the information relating to the 5G base stations are small, the device may calculate a low possibility that the device stays within the coverages of the 5G base stations.

Figure 2:
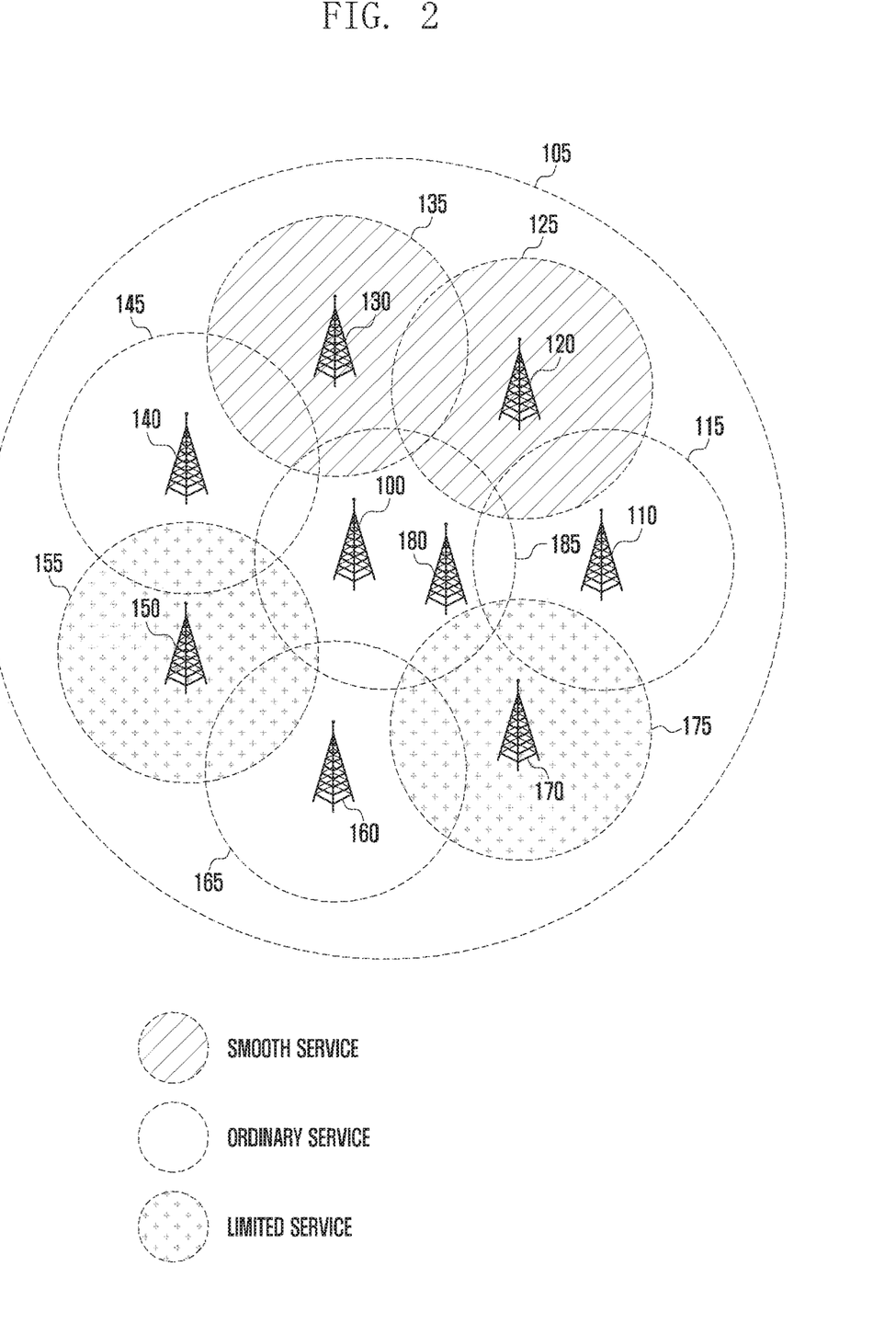
FIG. 2 illustrates an embodiment in which coverages of a plurality of 5G base stations having different service smoothness exist within a coverage of a 4G base station.

Meanwhile, FIG. 2 illustrates an embodiment in which coverages of a plurality of 5G base stations having different service smoothness exist within a coverage of a 4G base station.

The embodiment in FIG. 2 illustrates an example in which a first 5G base station 110 to an eighth 5G base station 180 exist within a coverage 105 of a 4G base station 100. If the plurality of 5G base stations 110, 120, 130, 140, 150, 160, 170, and 180 provide wireless communication services having different smoothness, respectively, the 4G base station 100 may broadcast information indicating the smoothness of the services of the plurality of 5G base stations 110, 120, 130, 140, 150, 160, 170, and 180.

If the smoothness of the wireless communication services provided by the plurality of 5G base stations 110, 120, 130, 140, 150, 160, 170, and 180, respectively, may be determined based on the strength of signals transmitted by the 5G base stations 110, 120, 130, 140, 150, 160, 170, and 180, respectively. The smoothness may be determined based on the surroundings of the 5G base stations 110, 120, 130, 140, 150, 160, 170, and 180. For example, if a structure, such as screening fence, a wall, or a building, exists in the vicinity of a random 5G base station, the random 5G base station may be determined to provide a wireless communication service having low smoothness.

Specifically, the smoothness qualities of the services of the 5G base stations 110, 120, 130, 140, 150, 160, 170, and 180 may be measured by provided 5G usage statistics of a user. In relation to the smoothness of the services of the 5G base stations 110, 120, 130, 140, 150, 160, 170, and 180, a database including quality information of a 5G network may be constructed by receiving 5G quality information of a user from the 4G base station 100 or the 5G base stations 110, 120, 130, 140, 150, 160, 170, and 180.

For example, the 4G base station 100 may receive, from at least one device, feedback on wireless communication services provided by the plurality of 5G base stations 110, 120, 130, 140, 150, 160, 170, and 180. The plurality of 5G base stations 110, 120, 130, 140, 150, 160, 170, and 180 may receive, from at least one device, feedback on wireless communication services. Then, the plurality of 5G base stations 110, 120, 130, 140, 150, 160, 170, and 180 may transmit the feedback to the 4G base station 100. Therefore, the 4G base station 100 may measure, based on the feedback, the qualities of the 5G wireless communication services by the plurality of 5G base stations 110, 120, 130, 140, 150, 160, 170, and 180. Accordingly, the 4G base station 100 can broadcast information indicating the smoothness of the services of the plurality of 5G base stations 110, 120, 130, 140, 150, 160, 170, and 180.

The 4G base station 100 may broadcast the information together with public land mobile network (PLMN) identifiers of the plurality of 5G base stations 110, 120, 130, 140, 150, 160, 170, and 180, location information of the second base station, or the like.

Therefore, a device receiving the information may predict a location at which a 5G wireless communication service is smooth, based on the information. Also, based on the received information, the moving direction and speed of the device, and the like, the device may determine whether a wireless communication service of each of the 5G base stations is available. For example, the device is a vehicle and the vehicle is traveling in a self-driving mode by using 5G wireless communication service. The vehicle may identify destination information, current location and speed information, and the like of the vehicle. During traveling in the self-driving mode, if the vehicle receives the information illustrated in FIG. 2 and broadcast by a 4G base station, the vehicle may determine whether the vehicle can continue autonomous driving by using the 5G wireless communication service, the determination being performed based on the destination information, and the current location and speed information of the vehicle. If a result of the determination indicates that the vehicle is not able to autonomously drive any longer by using the 5G wireless communication service, the vehicle may output a 5G wireless communication service termination warning message to a user. The vehicle may terminate the self-driving mode by using the 5G wireless communication service. Also, the vehicle may change the 5G wireless communication service to 4G wireless communication service to continue the self-driving mode. To this end, the vehicle may attempt to connect to the 4G base station and continue the self-driving mode by using 4G wireless communication service provided by the 4G base station.

Figure 3:
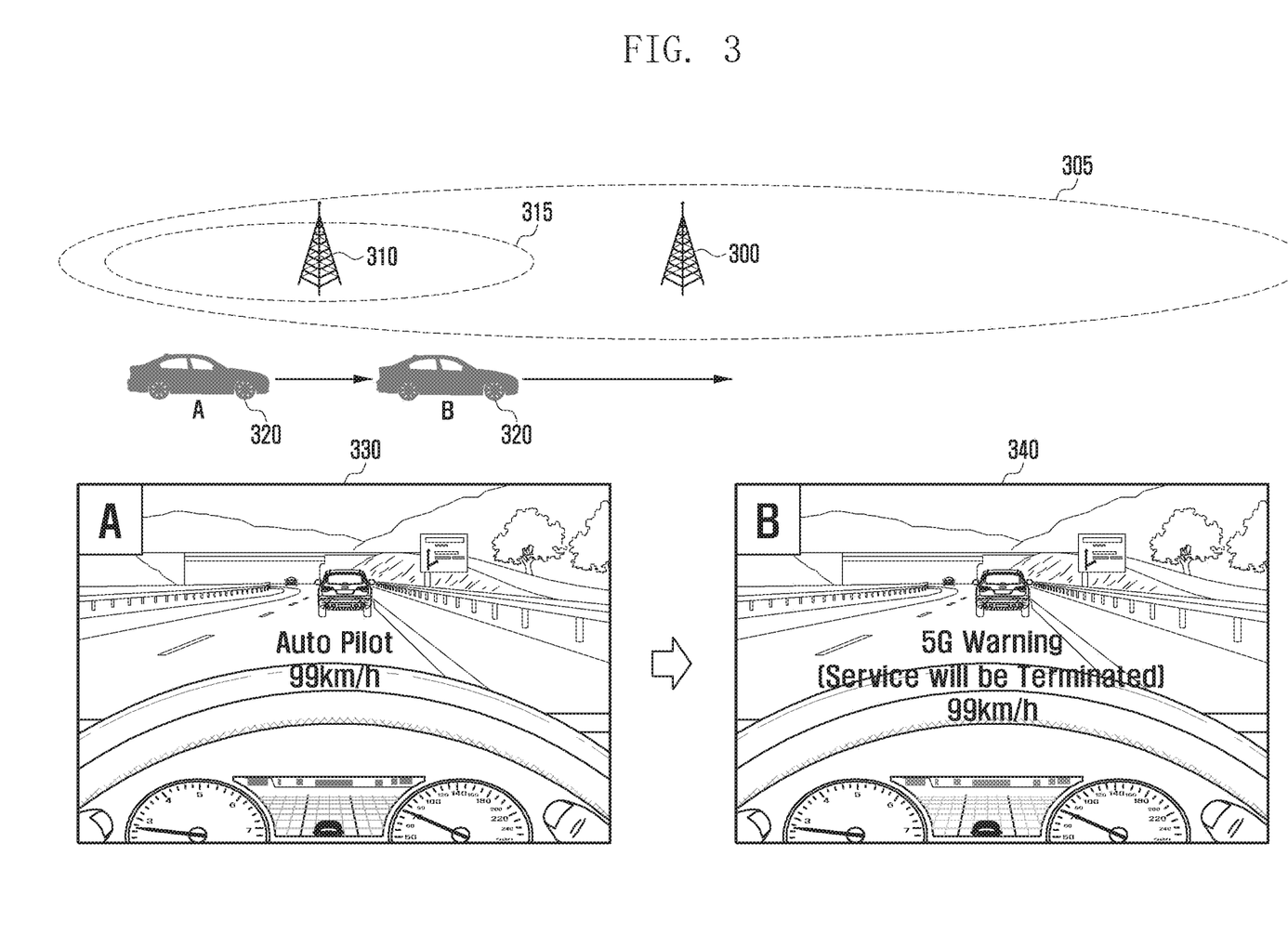
FIG. 3 illustrates an embodiment in which a device existing within a coverage of a 5G base station deviates from the coverage of the 5G base station according to an embodiment of the disclosure.

Specifically, the following specific description will be based on FIG. 3. A 4G base station 300 may broadcast information relating to a 5G base station 310 existing within a coverage 305. The information relating to the 5G base station 310 may include a public land mobile network (PLMN) identifier of the 5G base station 310, location information of the 5G base station 310, coverage information of the 5G base station 310, density information of the 5G base station 310, information relating to the strength of a signal of a communication system of the 5G base station 310, or the like.

A vehicle 320 existing within a coverage 315 of the 5G base station 310 may be traveling in a self-driving mode by using a wireless communication service of the 5G base station 310. Screen A indicated by reference numeral 330 may be displayed in the vehicle 320.

Meanwhile, according to the aforementioned method, if the vehicle 320 having received the information broadcast by the 4G base station 300 tries to deviate from the coverage 315 of the 5G base station 310, screen B indicated by reference numeral 340 may be displayed in the vehicle 320. In other words, the vehicle 320 may output a 5G wireless communication service termination warning message to a corresponding user.

The vehicle 320 may terminate the self-driving mode by using the 5G wireless communication service. For example, if after the 5G wireless communication service termination warning message is output, the user inputs a self-driving mode terminating command or a critical time interval has passed, the vehicle 320 may terminate the self-driving mode by using the 5G wireless communication service.

Also, the vehicle may change the 5G wireless communication service to a 4G wireless communication service to continue the self-driving mode. To this end, the vehicle 320 may attempt to connect to the 4G base station 300 and continue the self-driving mode by using a 4G wireless communication service provided by the 4G base station 300. The vehicle 320 may output a user interface (UI) for informing the user that the self-driving mode is performed by using the 4G wireless communication service.

Figure 4:
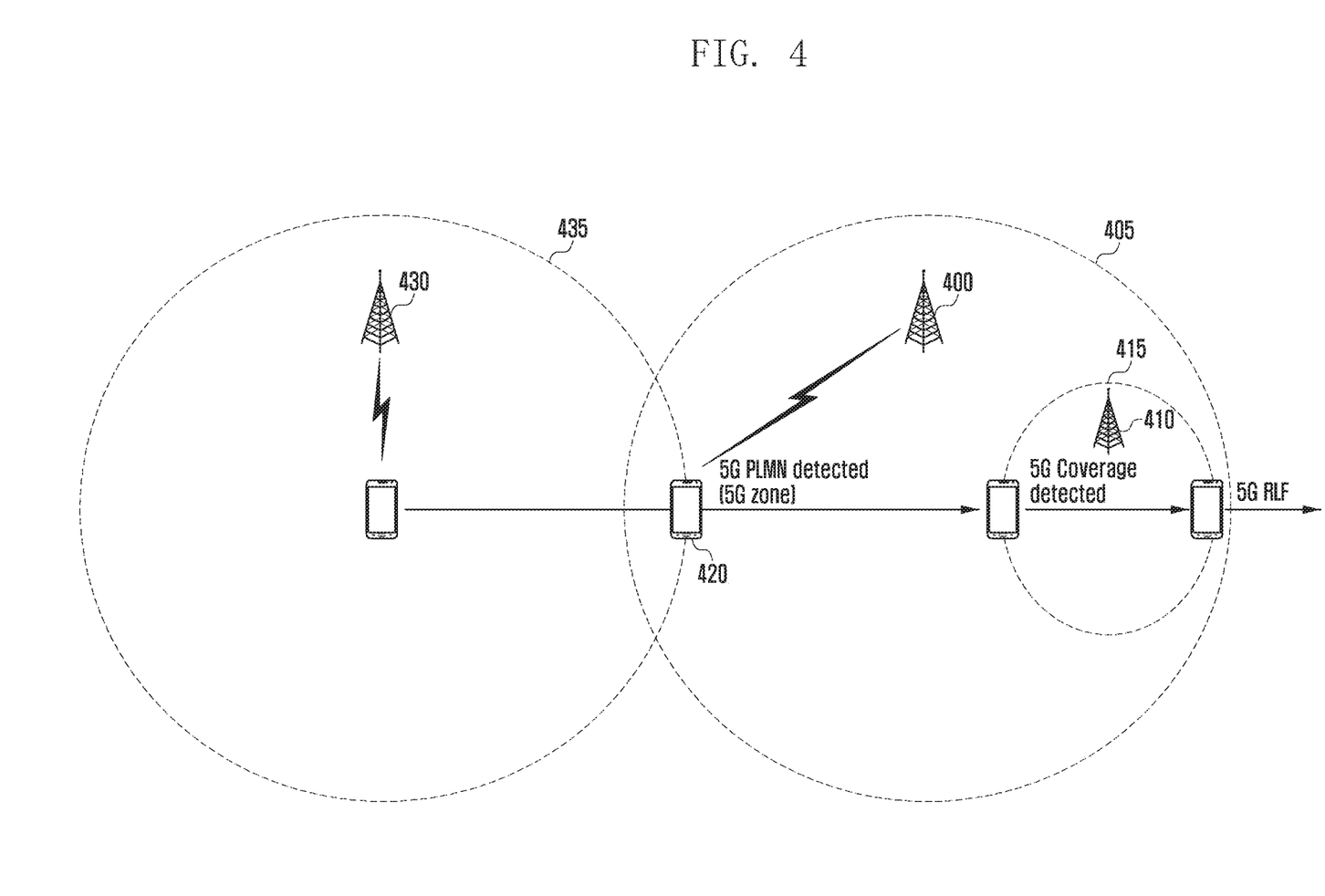
FIG. 4 illustrates a connection state of a mobile device receiving information from a 4G base station according to an embodiment of the disclosure.

Meanwhile, FIG. 4 illustrates a connection state of a mobile device receiving information from a 4G base station according to an embodiment of the disclosure.

As illustrated in FIG. 4, before entering with a coverage 405 of a 4G base station 400, a device 420 may exist within a coverage 435 of another 4G base station 430.

In the embodiment illustrated in FIG. 4, a 5G base station does not exist within a critical distance from the another 4G base station 430. Therefore, the device 420 may not be able to receive information relating to a 5G base station. For example, the another 4G base station 430 may only broadcast a 4G PLMN ID.

While the device 420 is moving to the coverage 405 of the 4G base station 400 from the coverage 435 of another 4G base station 430, the device may perform handover from the another 4G base station 430 to the 4G base station 400. As described above, the device 420 may receive information relating to a 5G base station 410 as well as information relating to the 4G base station from the 4G base station 400. For example, the device 420 may receive both a PLMN ID of the 4G base station and a PLMN ID of the 5G base station from the 4G base station 400. Therefore, the device 420 having moved into the coverage of the 4G base station 400 may sense a 5G PLMN as described in FIG. 4.

Meanwhile, the device 420 may further receive, from the 4G base station 400, a public land mobile network (PLMN) identifier of the 5G base station 410, location information of the 5G base station 410, coverage information of the 5G base station 410, density information of the 5G base station 410, information relating to the strength of a signal of a communication system of the 5G base station 410, or the like.

If the device 420 is determined, based on the information, to be able to be connected to the 5G base station 410, the device 420 may transmit a signal for connecting to the 5G base station 410. If a connection to the 5G base station 410 has succeeded, the device 420 may transmit or receive a signal by using the 5G wireless communication service.

Also, the device 420 may determine whether the device 420 can use a wireless communication system of the 5G base station 410, the determination being performed based on information broadcast by the 4G base station 400, the moving direction and moving speed of the device 420, and the like.

For example, the information broadcast by the 4G base station 400 may include information relating to the location of the 5G base station 410. Therefore, the device 420 may determine whether the device is approaching the 5G base station 410, the determination being performed based on the moving direction thereof. The device 420 may calculate, based on the moving speed, when the device reaches the coverage of the 5G base station 410. Therefore, the device 420 may determine a time point at which the device transmits a signal for connecting to the 5G base station 415, the determination being performed based on information broadcast by the 4G base station 400, the moving direction and moving speed of the device 420, and the like. The device 420 may change an Off state of a 5G chip to an On state.

Also, if the 5G wireless communication service is determined to be usable, based on information broadcast by the 4G base station 400, the moving direction and moving speed of the device 420, and the like, the device 420 may inform a corresponding user that the user can use the 5G wireless communication service. The device 420 may execute a service corresponding to a 5G communication system. For example, the device 420 may execute an application operating in a 5G communication system. The device 420 may change an execution level of an application into a level corresponding to the 5G communication system.

For example, the device 420 may activate a configured random service or application through application profiling only if a 5G communication system is used.

Specifically, if the device 420 is connected to the 5G base station 410, the device may download a large file having a critical size (e.g. 1 gigabyte) or greater. For example, even though a separate download command is not input from the user, if a connection to the 5G base station 410 has succeeded, the device 420 may download the large file.

The device 420 may update a background application. For example, even though a separate download command is not input from the user, if a connection to the 5G base station 410 has succeeded, the device 420 may update a background application.

Meanwhile, the device 420 may execute a differentiated service, such as panorama view conversion, automatic resolution adjustment, or a super-large file download, by using a 5G bandwidth.

The embodiment of FIG. 4 illustrates one 5G base station 410, but a plurality of 5G base stations 410 may exist within a critical distance from the 4G base station 400. The 4G base station 400 may broadcast messages including information relating to 5G base stations 410 existing within a critical distance in proportion to the number of the 5G base stations. Therefore, the device 420 may calculate the maintenance possibility of a 5G wireless communication service, based on the number of messages including information relating to the 5G base station 410, received from the 4G base station 400. For example, if the number of the received messages including information relating to the 5G base station 410 is large, the device may calculate a high possibility that the device stays within the coverage of the 5G base station 410. Meanwhile, if the number of the received messages including information relating to the 5G base station 410 is small, the device 420 may calculate a low possibility that the device stays within the coverage of the 5G base station 410.

Meanwhile, if the device 420 does not have a suitable application executed by using a wireless communication service provided by the 5G base station 410, the device 420 may put registration of information relating to a 5G coverage on hold or not activate the 5G chip in order to reduce terminal power consumption.

Also, if the device 420 deviates from the coverage of the 5G base station 410, the device 420 may turn off the 5G chip that has been turned on. The device 420 may change a 4G chip into an On state.

Figure 5:
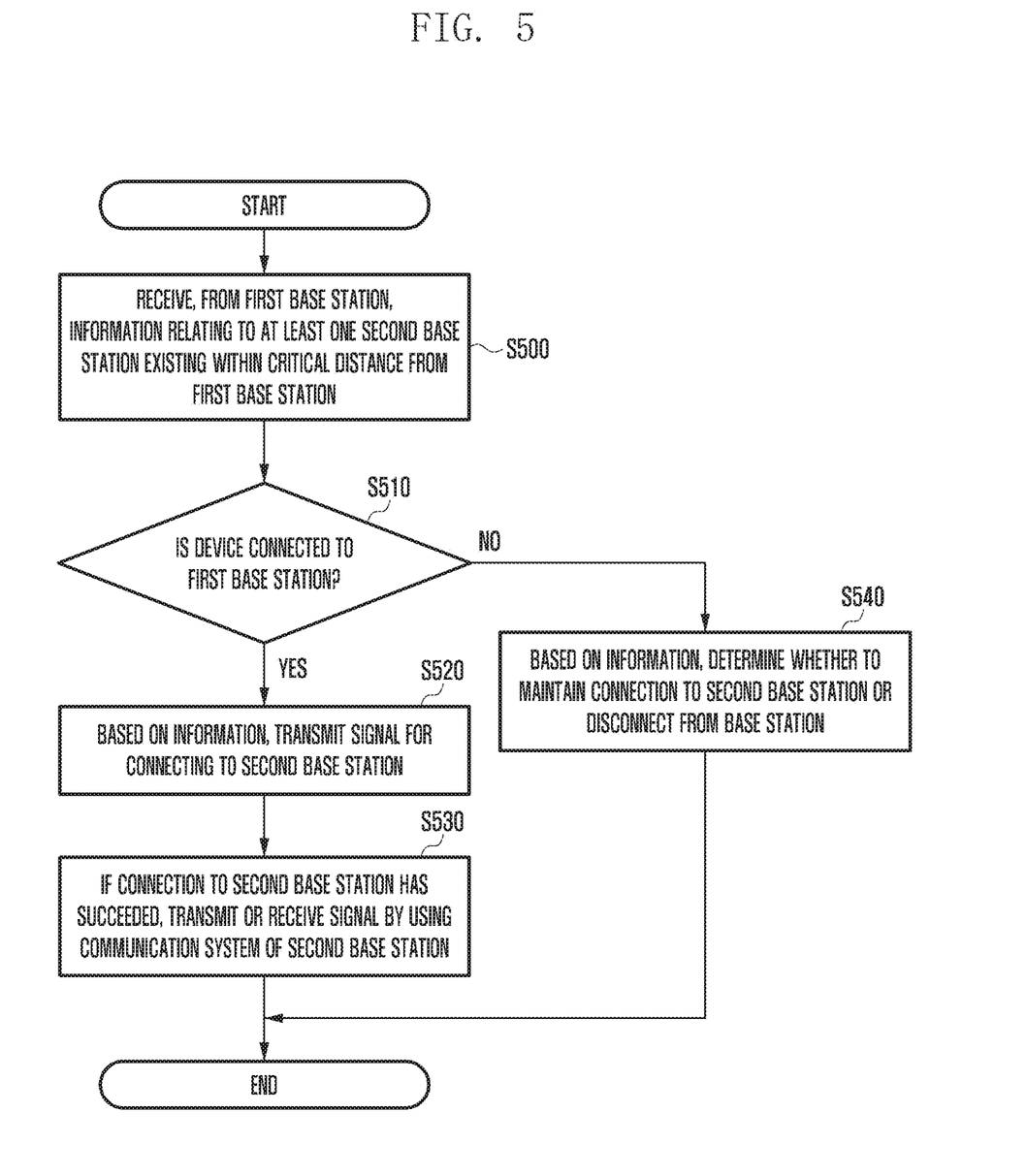
FIG. 5 is a flowchart illustrating a control method of a device according to an embodiment of the disclosure.

Meanwhile, FIG. 5 is a flowchart illustrating a control method of a device according to an embodiment of the disclosure.

First, in operation S500, a device may receive, from the first base station, information relating to at least one second base station existing within a critical distance from the first base station. The first base station may be a 4G base station. The second base station may be a 5G base station.

In operation S510, the device may determine whether the device is connected to the first base station. If a result of the determination indicates that the device is connected to the first base station, the device may transmit, based on the information, a signal for connecting to the second base station, in operation S520. The information transmitted by the first base station may include at least one of a public land mobile network (PLMN) identifier of the second base station, location information of the second base station, coverage information of the second base station, density information of the second base station, and information relating to the strength of a signal of a communication system of the second base station.

In addition, in operation S530, if a connection to the second base station has succeeded, the device may transmit or receive a signal by using a communication system of the second base station. Also, the device may calculate the availability of the communication system of the second base station, based on at least one of the moving direction and the moving speed of the device. Based on the calculated availability, the device may determine whether to disconnect from the second base station.

Meanwhile, if a result of the determination of S510 indicates that the device is not connected to the first base station, for example, the device is connected to the second base station, the device may determine, based on the information, whether to maintain the connection to the second base station or disconnect from the base station, in operation S540.

Figure 6:
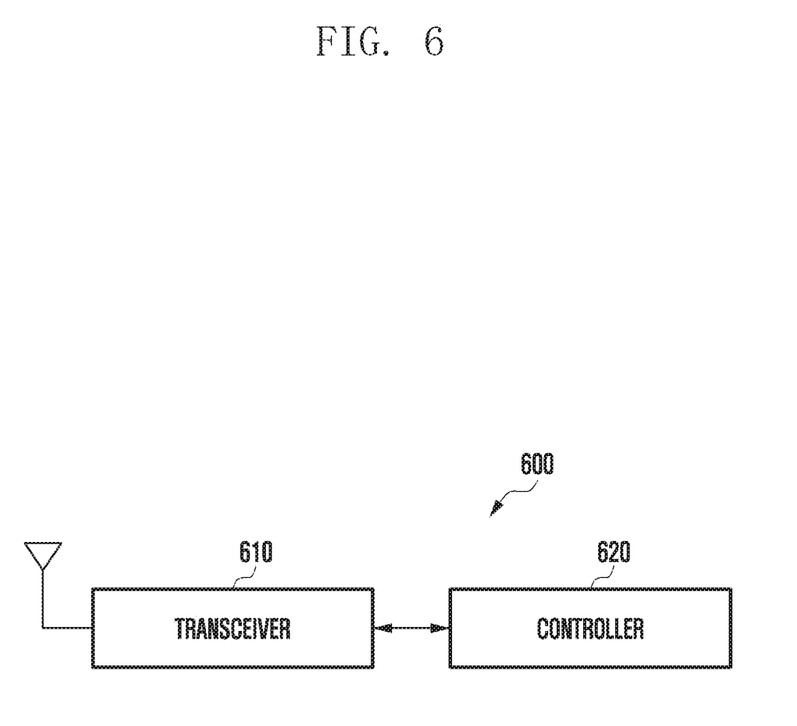
FIG. 6 is a block diagram illustrating elements of a base station according to an embodiment of the disclosure.

FIG. 6 is a block diagram illustrating elements of a base station according to an embodiment of the disclosure. The base station may be a 4G base station or a 5G base station.

A base station 600 may include a transceiver 610 and a controller 620. First, the transceiver 610 may transmit or receive a signal. For example, the transceiver 610 may transmit or receive a signal to or from another base station or a terminal. If the base station 600 is a 4G base station, the another base station may be a 5G base station.

Meanwhile, the controller 620 is an element for controlling the base station 600 overall.

The controller 620 may control the transceiver 610 to broadcast information relating to at least one second base station existing within a critical distance from the first base station.

The information may include at least one of a public land mobile network (PLMN) identifier of the at least one second base station, location information of the at least one second base station, coverage information of the at least one second base station, density information of the at least one second base station, and information relating to the strength of a signal of a communication system of the at least one second base station.

Also, based on the information, a device having received the information may determine whether to use a wireless communication system of the at least one second base station.

Figure 7:
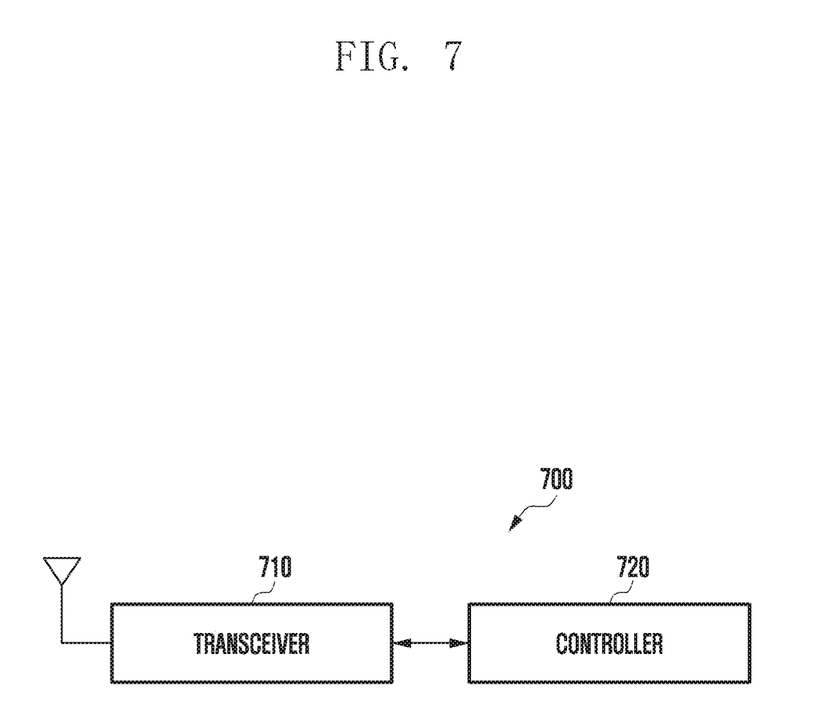
FIGS. 7 and 8 are block diagrams illustrating elements of a terminal according to an embodiment of the disclosure.

FIG. 7 is a block diagram illustrating elements of a device according to an embodiment of the disclosure.

As illustrated in FIG. 7, a device 700 may include a transceiver 710 and a controller 720.

First, the transceiver 710 may transmit or receive a signal. For example, the transceiver 710 may transmit or receive a signal to or from a base station or another terminal. The device 700 may transmit or receive a signal to or from a 5G base station as well as a 4G base station.

The controller 720 is an element for controlling the base station 700 overall.

The controller 720 may: control the transceiver to receive, from a first base station, information on at least one second base station existing within a critical distance from the first base station; and determine, based on the information, whether to use a wireless communication system of the at least one second base station.

The information transmitted by the first base station may include at least one of a public land mobile network (PLMN) identifier of the at least one second base station, location information of the at least one second base station, coverage information of the at least one second base station, density information of the at least one second base station, and information relating to the strength of a signal of a communication system of the at least one second base station.

In the case when the information is received while the device is connected to the first base station, if the wireless communication system of the second base station is determined, based on the information, to be usable, the controller 720 may control the transceiver 710 to transmit a signal for connecting to the second base station. Also, if a connection to the second base station has succeeded, the controller 720 may control the transceiver 710 to transmit or receive a signal by using a communication system of the second base station.

If the information broadcast by the first base station is received through the transceiver 710 while the device 700 is connected to the second base station, the controller 720 may determine, based on the information, whether to maintain the connection to the second base station or disconnect from the second base station.

If the information broadcast by the first base station is received through the transceiver 710 while the device 700 is connected to the second base station, the controller 720 may calculate the availability of the communication system of the second base station, based on the information and at least one of the moving direction and the moving speed of the device. Based on the calculated availability, the controller 720 may determine whether to disconnect from the second base station.

The device 700 may further include a 5G chip. If the information is received while the device 700 is connected to the first base station, the controller 720 may control, based on the information, the 5G chip to be turned on, which has been turned off.

The first base station may be an LTE base station, and the second base station may be a 5G base station.

Figure 8:
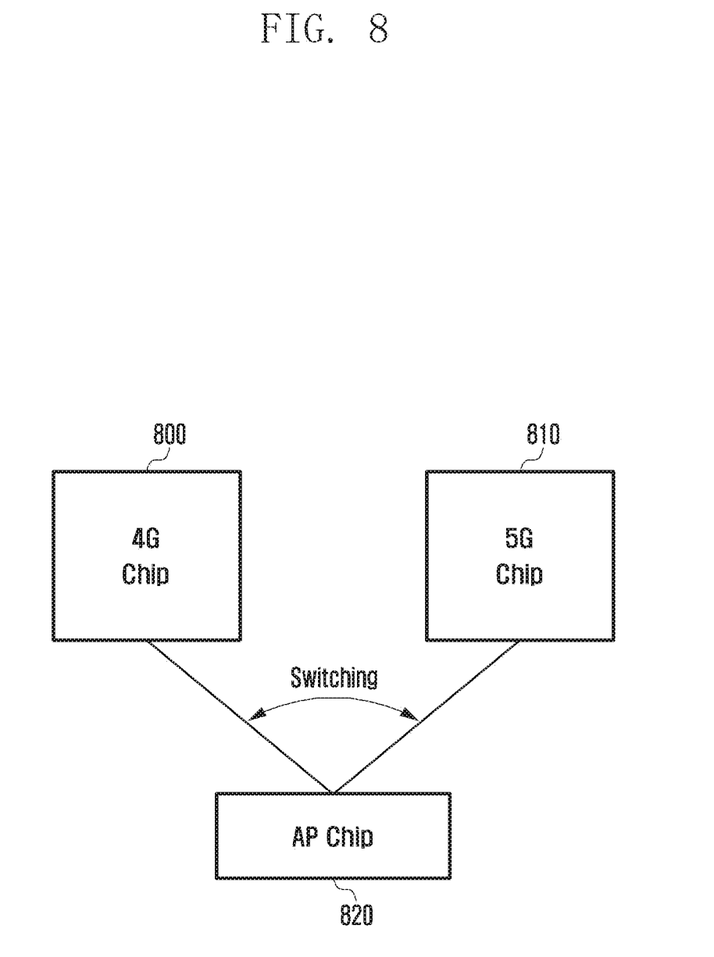

FIG. 8 illustrates a 4G chip 800, a 5G chip 810, and an AP chip 820 of a device. A device may include both the 4G chip 800 and the 5G chip 810. Under the control of the application processor (AP) chip 820 of the device, the 4G chip 800 and the 5G chip 810 may be controlled to be turned on or off.

For example, the AP chip 820 of the device may connect to the 4G chip 800 and receive a wireless communication service provided by a 4G base station, before the AP chip receives information relating to a 5G base station from the 4G base station and attempts to connect to the 5G base station.

If information relating to the 5G base station is received from the 4G base station and the 5G base station is determined to be connectable, the AP chip 820 of the device may switch the connection from the 4G chip 800 to the 5G chip 810. The AP chip 820 of the device is able to attempt to connect to the 5G base station by using the 5G chip 810.

A device as described above can previously determine whether a 5G communication system is connectable or whether the 5G communication system can be used continuously, by using information broadcast by a 4G base station.

Although the exemplary embodiments of the disclosure have been illustrated and described, the disclosure is not limited thereto. It is apparent that various modified implementations can be made by those skilled in the art without departing from the scope of the disclosure claimed by the claims, and the modified implementations should not be construed separately from the technical idea or view of the disclosure.

The invention claimed is:

1. A method performed by a terminal in a wireless communication system, the method comprising:
   receiving, from a first base station related to a first a radio access technology (RAT), at least one message including location information of a second base station related to a second RAT;
   identifying mobility information of the terminal;
   determining whether the terminal is to be located within a coverage of the second base station based on the location information of the second base station and the mobility information of the terminal;
   generating a signal for connecting to the second base station based on a result of the determination; and
   after connecting to the second base station, determining whether the terminal is to be located outside the coverage of the second base station based on the location information of the second base station and the mobility information of the terminal.

2. The method of claim 1, wherein the at least one message further includes at least one of a public land mobile network (PLMN) identifier of the second base station, and coverage information of the second base station.

3. The method of claim 1,
   wherein the at least one message further includes information associated with a signal strength of the second base station, and
   wherein determining whether the terminal is to be located within the coverage of the second base station comprises generating a database for a quality of the second RAT based on the information associated with the signal strength of the second base station.

4. The method of claim 1, further comprising:
   identifying a number of the at least one message received from the first base station, in case that the terminal is connected to the second base station; and
   determining whether to maintain a connection to the second base station, based on the number of the at least one message received from the first base station.

5. The method of claim 1, further comprising displaying a screen to notify that the second RAT is to be terminated, based on a result of the determination that the terminal is to be located outside the coverage of the second base station.

6. The method of claim 1, further comprising determining to connect to the first base station based on a result of the determination that the terminal is to be located outside the coverage of the second base station.

7. A terminal in a wireless communication system, the terminal comprising:
   a transceiver; and
   a controller coupled with the transceiver and configured to:
      receive, from a first base station related to a first a radio access technology (RAT) via the transceiver, at least one message including location information of a second base station related to a second RAT,
      identify mobility information of the terminal,
      determine whether the terminal is to be located within a coverage of the second base station based on the location information of the second base station and the mobility information of the terminal,
      generate a signal for connecting to the second base station based on a result of the determination, and
      after connecting to the second base station, determine whether the terminal is to be located outside the coverage of the second base station based on the location information of the second base station and the mobility information of the terminal.

8. The terminal of claim 7, wherein the at least one message further includes at least one of a public land mobile network (PLMN) identifier of the second base station, and coverage information of the second base station.

9. The terminal of claim 7,
   wherein the at least one message further includes information associated with a signal strength of the second base station, and
   wherein, to determine whether the terminal is to be located within the coverage of the second base station, the controller is configured to generate a database for a quality of the second RAT based on the information associated with the signal strength of the second base station.

10. The terminal of claim 7, wherein the controller is further configured to:
    identify a number of the at least one message received from the first base station, in case that the terminal is connected to the second base station, and
    determine whether to maintain a connection to the second base station, based on the number of the at least one message received from the first base station.

11. The terminal of claim 7, wherein the controller is further configured to display a screen to notify that the second RAT is to be terminated, based on a result of the determination that the terminal is to be located outside the coverage of the second base station.

12. The terminal of claim 7, wherein the controller is further configured to determine to connect to the first base station based on a result of the determination that the terminal is to be located outside the coverage of the second base station.

* * * * *